United States Patent
Matsufuji

[11] Patent Number: 6,125,961
[45] Date of Patent: Oct. 3, 2000

[54] FOUR-WHEEL DRIVE VEHICLE

[75] Inventor: Mizuya Matsufuji, Amagasaki, Japan

[73] Assignee: Kanzaki Kokyukoko Mfg. Co., Ltd., Japan

[21] Appl. No.: 09/203,606

[22] Filed: Dec. 2, 1998

[30] Foreign Application Priority Data

Dec. 2, 1997 [JP] Japan ................................. 9-331850
Apr. 14, 1998 [JP] Japan ................................. 10-102474

[51] Int. Cl.$^7$ ..................... B60K 17/348; B60K 17/354
[52] U.S. Cl. .................... 180/233; 180/244; 180/248; 180/247; 74/665 T
[58] Field of Search .................... 180/233, 248, 180/247, 249, 347, 291; 74/665 T

[56] References Cited

U.S. PATENT DOCUMENTS

| | | | |
|---|---|---|---|
| 4,506,773 | 3/1985 | Schott | 192/52.4 |
| 4,671,376 | 6/1987 | Ito et al. | 180/249 |
| 4,856,611 | 8/1989 | Teraoka et al. | 180/233 |
| 5,067,935 | 11/1991 | Brown et al. | 475/248 |
| 5,099,943 | 3/1992 | Resca et al. | 180/233 |
| 5,293,956 | 3/1994 | Onishi | 180/233 |
| 5,564,518 | 10/1996 | Ishii et al. | 180/242 |
| 5,584,776 | 12/1996 | Weilant et al. | 475/213 |
| 5,802,489 | 9/1998 | Orbach et al. | 180/247 |

*Primary Examiner*—Brian L. Johnson
*Assistant Examiner*—Tony Winner
*Attorney, Agent, or Firm*—Sterne, Kessler, Goldstein & Fox PLLC

[57] ABSTRACT

A four-wheel drive vehicle includes a first transmission system for transmitting power from an engine to a left and a right first driving wheel provided with a braking unit, and a second transmission system branching off from the first transmission system to transmit power to a second pair of driving wheels serving as steerable wheels. The second transmission system is provided therein with a frictional transmission passage having a frictional torque, which is smaller than that between the second driving wheels and a road surface, and a direct transmission passage disposed in parallel with the frictional transmission passage, so that either passage can be selected. The frictional transmission passage is selected when a speed-changing operating tool is set to its high speed position or when a steering device is operated beyond a predetermined angle, and the direct transmission passage is selected in all other cases.

30 Claims, 8 Drawing Sheets

FOUR-WHEEL DRIVE VEHICLE

BACKGROUND OF THE INVENTION

1. Field of the Invention

The present invention relates to a four-wheel drive vehicle, such as a tractor or the like, having a power transmission system for a second pair of driving wheels (front wheels) branching from a power transmission system for a first pair of driving wheels (rear wheels) equipped with a braking unit.

2. Related Art

As compared to a two-wheel drive system, a four-wheel drive system easily creates a strong propelling force so as to be effective in climbing a hill or working in a paddy field.

However, driving the front wheels on a low-resistant flat road, such as an asphalt way or the like, wastes power. Furthermore, inasmuch as the peripheral speed of the front wheels is set slightly higher than that of the rear wheels, in order to minimize the cornering radius of the vehicle, the problem arises that the grip of the rear wheels causes the front wheels to slip and to wear during usual travel on the road.

Therefore, a typical operator on a flat road shuts-off power transmission to the front wheels, so as to drive only the rear wheels. In other words, the operator causes the vehicle to travel in the two-wheel drive mode during usual travel on a road.

When the rear wheels are braked in the four-wheel drive mode, the braking force to the rear wheels extends to the front wheels such that frictional resistance is generated between all four wheels and the road. However, when the rear wheels are braked in the two-wheel drive mode, frictional resistance is only generated between the rear wheels and the road, such that the problem arises that the braking distance becomes longer than that for a four-wheel drive vehicle.

SUMMARY OF THE INVENTION

The present invention provides a four-wheel drive vehicle in which a second transmission system for a second pair of steerable driving wheels is branched off from a first transmission system between a prime mover and a first pair of driving wheels provided with respective braking units, thereby limiting the peripheral speed of the second pair of driving wheels so as not to exceed that of the first pair of driving wheels. Therefore, the four-wheel drive vehicle according to the present invention prevents the second pair of driving wheels from slipping and allows the braking force of the first pair of driving wheels to extend to the second pair of driving wheels so as to reduce the braking distance.

Additionally, the second transmission system is provided with a frictional transmission passage, having a smaller frictional torque then that between the second pair of driving wheels and the road, and a direct transmission passage in parallel to the frictional transmission passage, so that one of either of the transmission passages can be selected.

According to such a construction, when traveling on a field, an operator selects the direct transmission passage so as to drive all four wheels, thereby obtaining a strong propelling force, whereby the efficiency of the vehicle can be increased. When traveling on a road, the operator selects the frictional transmission passage, so that when friction is generated between the second pair of driving wheels and the road, a slip is generated in the frictional transmission passage having the smaller frictional torque than that of the friction between the second pair of driving wheels and the road. Thus, similar to a two-wheel drive vehicle, the peripheral speed of the second pair of driving wheels does not exceed that of the first pair of driving wheels, thereby preventing the second pair of driving wheels from slipping and enabling small cornering to be done without damage of the road.

Also, power is always transmitted to the second pair of driving wheels through the frictional transmission passage, so that once the first pair of driving wheels are braked through the braking units, the braking force reaches the second driving wheels. Thus, frictional resistance is generated between all four wheels and the road so as to reduce the braking distance.

Furthermore, in such a construction where the frictional transmission passage and the direct transmission passage are disposed in parallel in the second transmission system, a transmission gear taking power from the first transmission system for driving the second pair of driving wheels is freely provided on an output shaft drivingly connected to the second pair of driving wheels. A frictional transmission device is provided between the transmission gear and the output shaft so as to construct the frictional transmission passage. A direct transmission device is also provided on the output shaft so as to be disposed in parallel with the frictional transmission device. Whereby a switching portion can be shared between both devices so as to simplify and compact the construction.

Alternatively, a frictional transmission passage can be provided in the second transmission system so as to allow for switching between a state in which the frictional torque of the frictional transmission passage is smaller than that between the second pair driving wheels and the road and a state in which the frictional torque of the frictional transmission passage is not smaller than the frictional torque between the second pair of driving wheels and the road.

According to such a construction, when traveling on a field, an operator selects the frictional transmission passage state in which the frictional torque is not smaller than the frictional torque between the second pair of driving wheels and the road, so as to bring the vehicle into the four-wheel drive mode, such that the efficiency of the vehicle can be increased by the strong propelling force. When traveling on a road, the operator selects the frictional transmission passage state in which the frictional torque is smaller than the frictional torque between the second pair of driving wheels and the road, such that when friction is generated between the second pair of driving wheels and the road, a slip is generated in the frictional transmission passage, because the frictional torque of the frictional transmission passage is smaller than that of the friction between the second pair of driving wheels and the road. Therefore, similar to a two-wheel drive vehicle, the peripheral speed of the second pair of driving wheels does not exceed that of the first pair of driving wheels, thereby preventing the second pair of driving wheels from slipping and enabling small cornering to be done without damage of the road.

Also, power is always transmitted to the second pair of driving wheels through the frictional transmission passage even if the small frictional torque state is selected. Once the first pair of driving wheels are braked through the braking units, the braking force reaches the second driving wheels. Frictional resistance is generated between all four wheels and the road so as to reduce the braking distance.

Additionally, according to such a construction, both states of the frictional transmission device are in the four-wheel drive mode, thereby simplifying and compacting the structure of the second transmission system.

The selection of the frictional transmitting passage, when using the former second transmitting system having both the frictional transmission passage and the direct transmission passage disposed in parallel, is automatically performed when a speed-changing means disposed in the first transmission system is set to a high-speed position. Similarly, the selection of the state of the transmission passage in which the frictional torque is small, when using the latter second transmission system having only the frictional transmission passage, is automatically performed when speed-changing means disposed in the first transmission system is set to a high-speed position.

Accordingly, when an operator shifts the speed-changing operating tool to the high-speed position, driving power is automatically transmitted to the second pair of driving wheels through the frictional transmission passage, when the frictional torque is small, thereby preventing the second pair of driving wheels from slipping and reducing the braking distance without further change to the driving mode, thereby simplifying and easing the operator's operation.

Furthermore, the selection of the frictional transmission passage when using the former second transmission system having both the frictional transmission passage and the direct transmission passage disposed in parallel, and the selection of the state of the frictional transmission passage in which the frictional torque is small, when using the latter second transmission system having only the frictional transmission passage, are automatically performed when a steering operating tool is steered beyond a predetermined degree.

Accordingly, when an operator operates the steering operating tool beyond the predetermined degree, driving power is automatically transmitted to the second pair of driving wheels through the frictional transmission passage, when the frictional torque is small, thereby preventing the second pair of driving wheels from slipping and reducing the braking distance without further change in the driving mode, thereby simplifying and easing the operator's operation.

Furthermore, when either the former or the latter second transmission system is used, the power transmission to the second pair of driving wheels may be made or shut off. Accordingly, the vehicle can travel in the two-wheel drive mode when the power transmission to the second pair of driving wheels is shut off, thereby saving energy during travel on a road.

With these and other objects in view, the present invention consists of the methods and the construction hereinafter fully described, illustrated in the accompanying drawings, and set forth in the claims hereto appended, it being understood that various changes in the operation, form, proportion and minor details of construction, within the scope of the claims, may be resorted to without departing from the spirit of the present invention or sacrificing any of the advantages thereof.

DETAILED DESCRIPTION OF THE PREFERRED EMBODIMENTS

Figure 1:
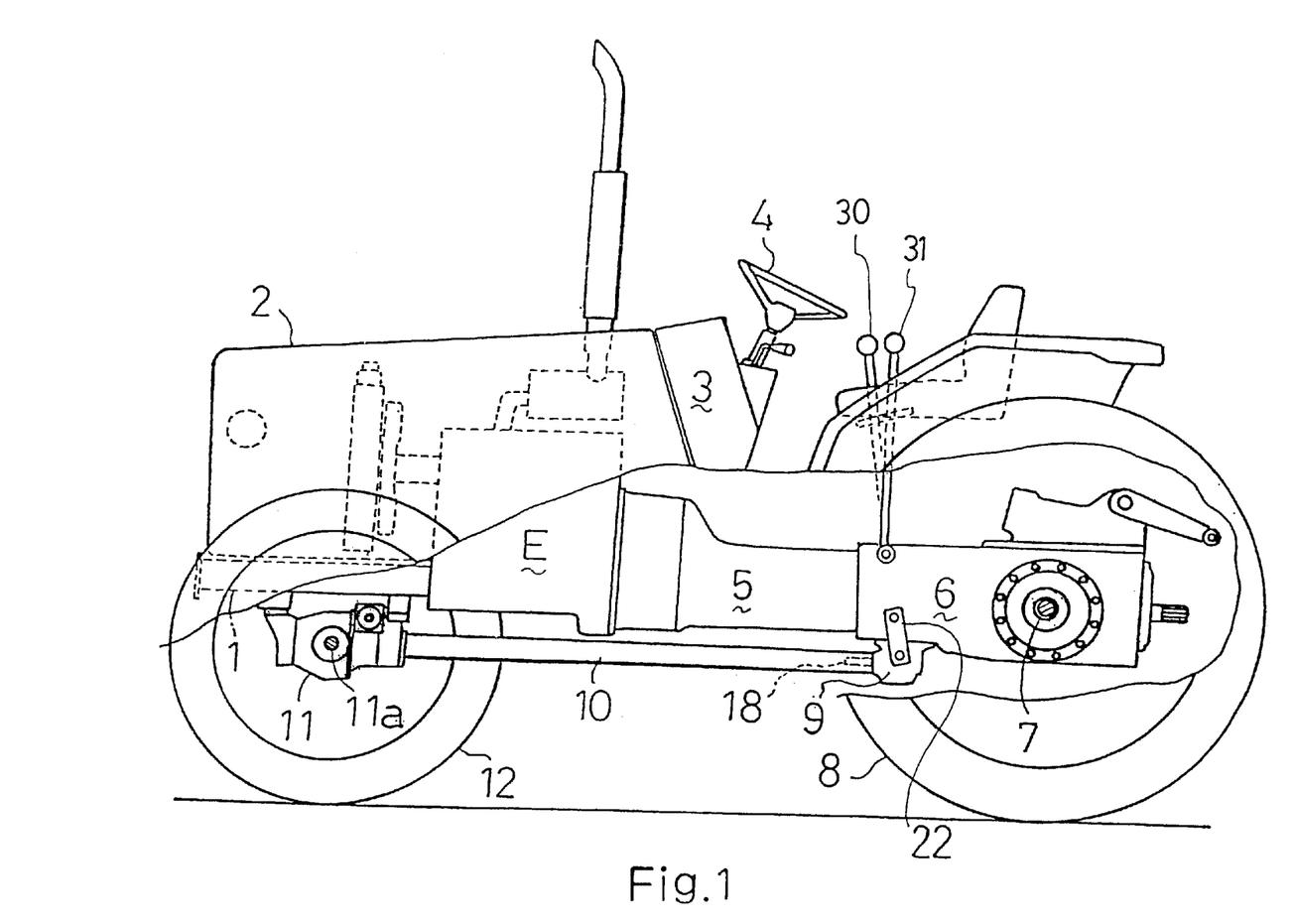
FIG. 1 is a side view of a tractor serving as a four-wheel drive vehicle employing the construction according to the present invention.

At first, a whole structure for a tractor will now be described with particular reference to FIG. 1. An engine E, a battery and the like are mounted on an engine frame 1 and covered with a bonnet 2. A dashboard 3, having a steering wheel 4 thereabove, is disposed at the rear end of bonnet 2. A clutch housing 5 is disposed behind engine E and a transmission casing 6 is disposed behind clutch housing 5. A rear-wheel differential unit is equipped within transmission casing 6. Left and right rear axles 7 extend from both the left and right sides of transmission casing 6. A rear wheel 8 serving as a first driving wheel is attached to an outer end of each rear axle 7. A conventional braking device is equipped on each rear axle 7 such that an operator can apply a braking force onto both rear wheels 8 by stepping on a break pedal disposed on a footboard of an operator's area.

A main-speed-changing unit and sub-speed-changing unit are disposed in line through clutch housing 5 and transmission casing 6 in order to drivingly connect an output shaft of engine E with the rear-wheel differential unit. A front wheel drive power take out casing 9, housing a transmission device therein for branching off from the power transmission passage to rear wheels 8, is attached to the lower end of transmission casing 6. The transmission device in front wheel drive power take out casing 9 transmits power to front wheels 12, discussed below, for rotating front wheels 12 simultaneously with rear wheels 8, as discussed below. A front end of an output shaft 18 extending forward from front wheel drive power take out casing 9 is connected with a front wheel differential unit in a front axle casing 11, disposed at the lower portion of engine frame 1, through universal joints and a transmission shaft 10. A front wheel 12 is attached to an outer end of each front axle 11a extending outward from both lateral sides of front axle casing 11. Front wheels 12 can be steered by operating a steering wheel 4.

Figure 4:
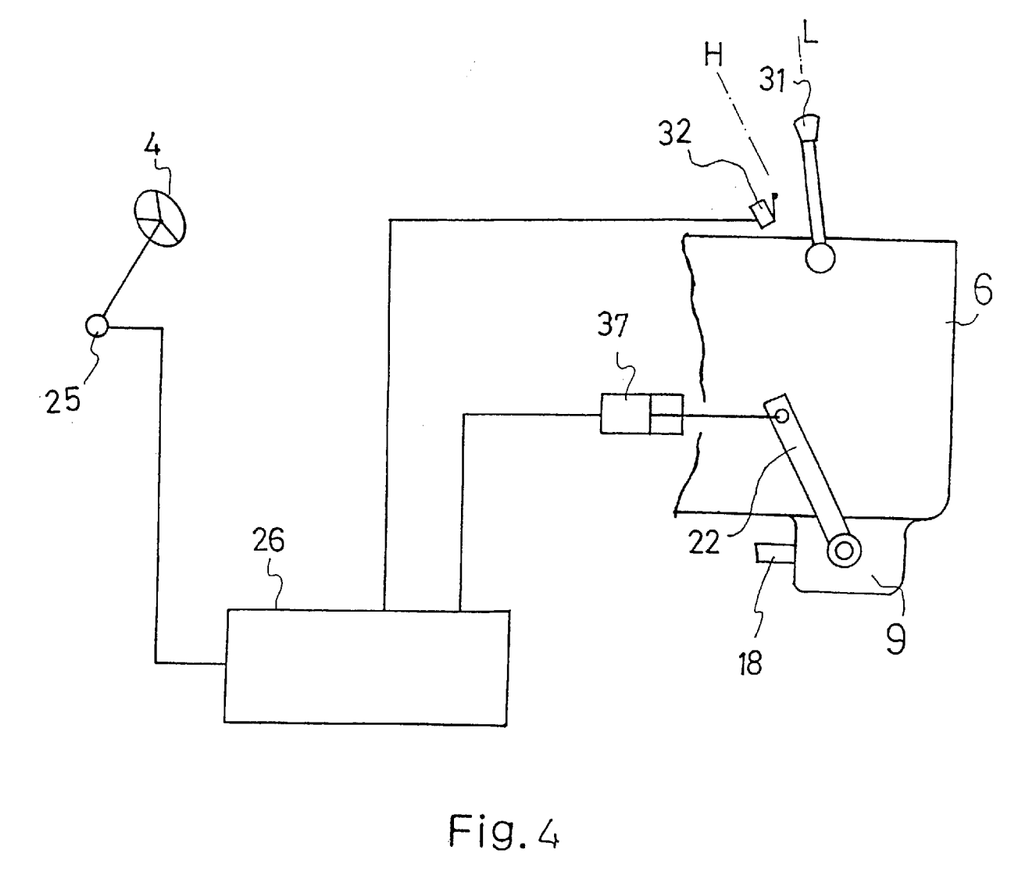
FIG. 4 is a block diagram of a control system for switching the mode of front wheel drive power transmission.

As shown in FIG. 4, a sensor 25 for detecting the steering angle of steering wheel 4 is disposed at a point along a steering mechanism that extends from steering wheel 4 through a stem, a pitman arm and the like to front wheels 12, for example, sensor 25 may be disposed on the base portion of the stem. Near dashboard 3 are disposed a seat or the like, a main-speed-changing lever 30 and a sub-speed-changing lever 31 for switching the main-speed-changing unit and the sub-speed-changing unit. A sensor 32 detecting the high speed position of sub-speed-changing lever 31 is disposed thereabout. Sensor 25 and sensor 32 are connected to a controller 26.

Figure 2:
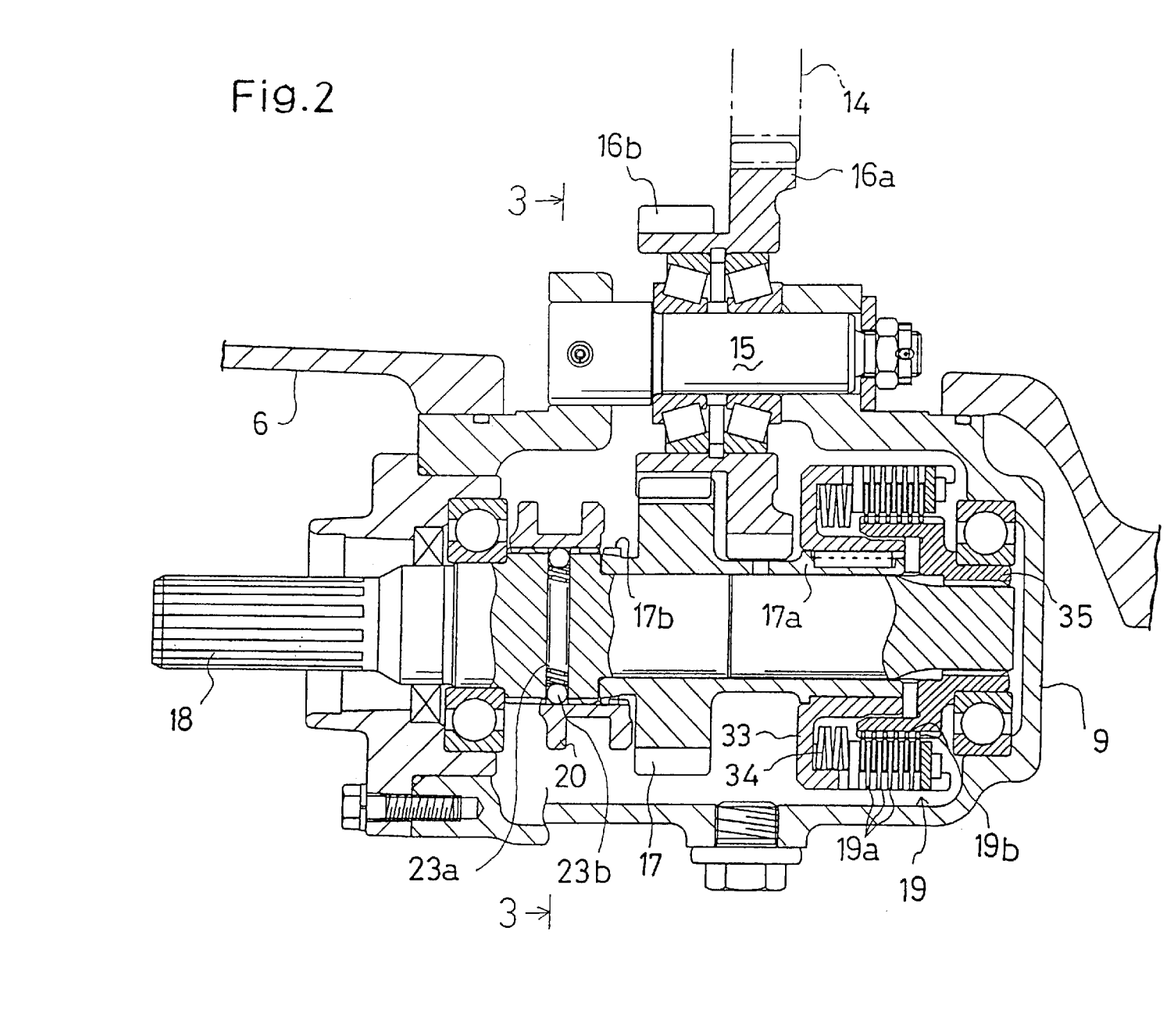
FIG. 2 is a cross-sectional side view of a front wheel drive power take out mechanism according to the first embodiment of the present invention.
Figure 3:
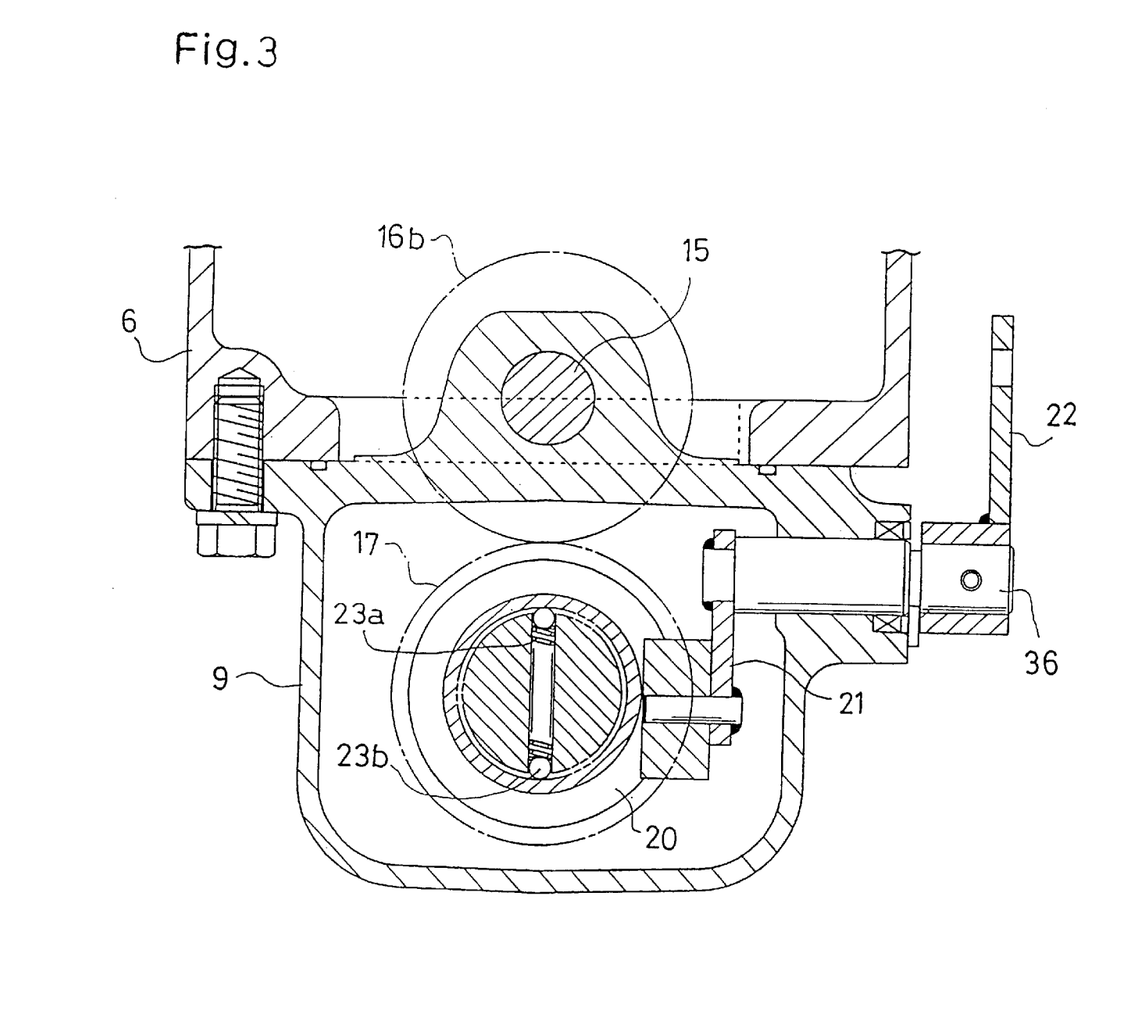
FIG. 3 is a cross-sectional view in the direction of the arrows 3—3 in FIG. 2.

Next, explanation will be given of a transmission mechanism disposed in front wheel drive power take out casing 9 provided according to a first embodiment of the present invention. Referring to FIGS. 2 and 3, a front wheel drive power take out gear 14 is disposed on a transmission shaft (not shown; a speed-changing shaft connected with the rear wheel differential unit) disposed in transmission casing 6 for driving rear wheels 8. Front wheel drive power take out gear 14 engages with a large diametric gear 16a of a double counter gear 16 pivotally provided on a counter shaft 15 horizontally disposed at the upper portion of front wheel drive power take out casing 9. Forwardly extending output shaft 18 drivingly connected with front wheels 12, as mentioned above, is journalled in front wheel drive power take out casing 9 in the longitudinal direction of the vehicle. A transmission gear 17 pivotally provided on output shaft 18 engages with a small diametric gear 16b of double counter gear 16.

As shown in FIG. 2, a frictional transmission device 19 is provided between output shaft 18 and transmission gear 17. In detail, a clutch casing 33 is fixed on a boss 17a projecting from a side surface of transmission gear 17. Clutch casing 33 is provided therein with a spring 34 and a plurality of driving-side frictional plates 19a, which engage with clutch casing 33 so as not to be relatively rotatable. A plurality of following-side frictional plates 19b are engaged on the periphery of a rotational member 35 fixed on output shaft 18 so as not to be relatively rotatable. Each of frictional plates 19a and each of frictional plates 19b are juxtaposed and overlap when viewed in the direction of the axis of output shaft 18. All juxtaposed frictional plates 19a and 19b are pressed against each other by the predetermined biasing force of spring 34.

The peripheral speed of front wheels 12 is set slightly higher than that of rear wheels 8 in consideration of the cornering of a four-wheel drive vehicle like a tractor. When the four-wheel drive vehicle travels on a flat road, friction is generated between the road and front wheels 12 by the difference in peripheral speed between front wheels 12 and rear wheels 8. According to the present invention, the frictional torque of frictional transmission device 19, which is determined by the preselected biasing force of spring 34, is set smaller than that of the friction generated between the road and front wheels 12 when traveling on a road in the four-wheel drive mode.

Figure 8:
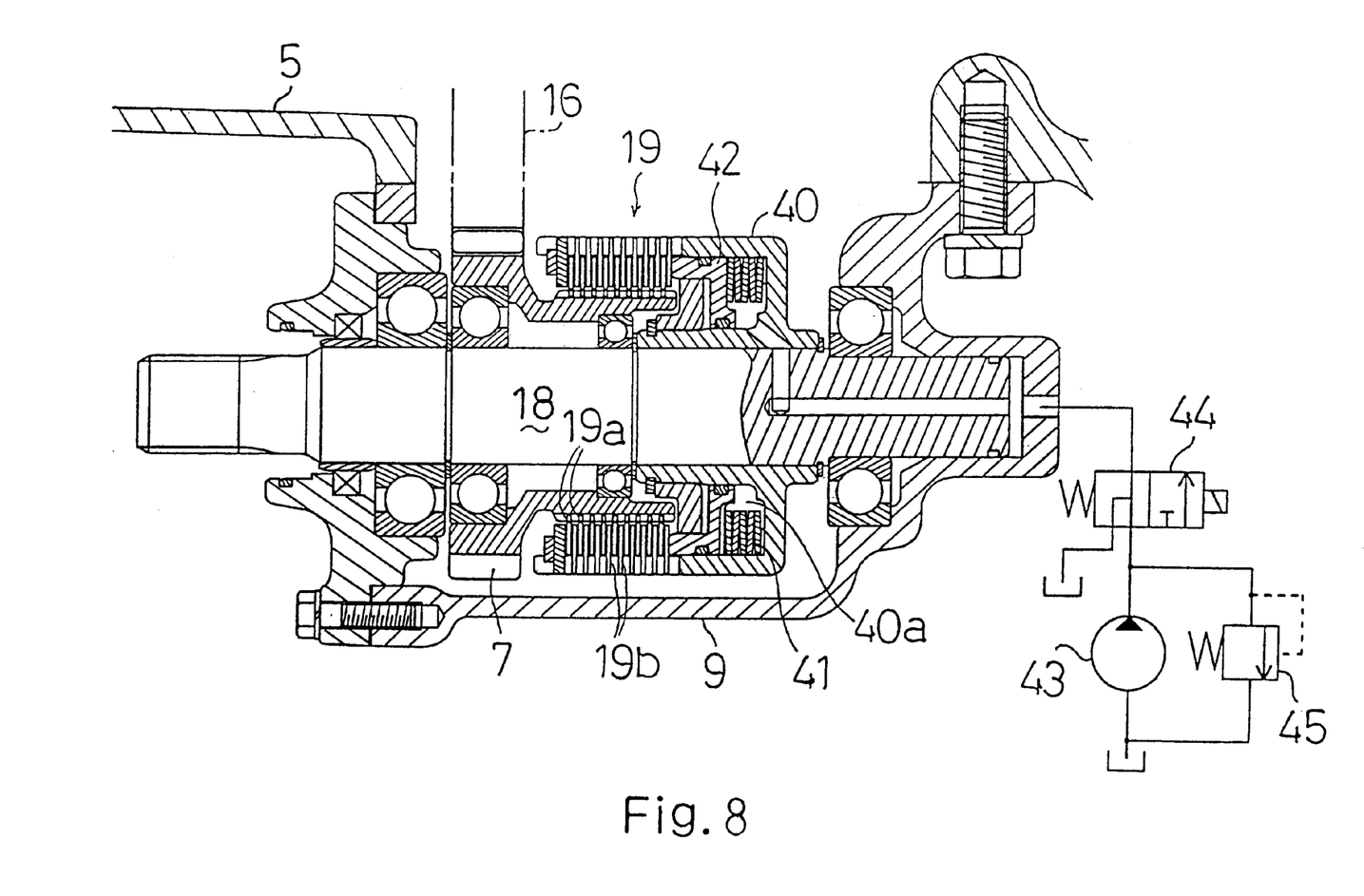
FIG. 8 is a cross-sectional side view of a front wheel drive power take out mechanism according to the fifth embodiment of the present invention.

Clutch teeth 17b are formed at the other side surface of transmission gear 17. A sleeve 20 is splined-engaged with the periphery of output shaft 18 so as to not be relatively rotatable and be axially slidable and is juxtaposed with clutch teeth 17b. A shifter 21 is engaged into the loop-shaped groove of sleeve 20. As shown in FIG. 8, an operation shaft 36 is journalled through the side wall of front wheel drive power take out casing 9. The base portion of shifter 21 is fixed onto the inner end of operation shaft 36 in casing 9. The end of a shift arm 22 is fixed on the outer end portion of operation shaft 36 at the outside of casing 9. The other end of shift arm 22, as shown in FIG. 4, is connected with slide actuator 37, comprising a cylinder, a solenoid or the like, controlled by controller 26.

Axial sliding of sleeve 20 allows switching between the two modes of power transmission to front wheels 12. In detail, when slid rearward, sleeve 20 (shown under output shaft 18 in FIG. 2) is engaged with clutch teeth 17b so as to switch to the direct transmission mode in which transmission gear 17 and output shaft 18 are directly connected with each other. On the other hand, when slid forward, sleeve 20 (shown above output shaft 18 in FIG. 2) is disengaged from clutch teeth 17b so as to switch to the frictional transmission mode in which power is transmitted from transmission gear 17 to output shaft 18 through frictional transmission device 19. A detent spring 23a and a pair of detent balls 23b are inserted in a diametric through hole bored in output shaft 18 and each detent ball 23b is biased against the inner periphery of sleeve 20 by detent spring 23b so as to locate sleeve 20 to the positions for the respective modes.

When sleeve 20 is switched to the direct transmission mode, transmission gear 17 is directly connected with output shaft 18 such that output shaft 18 rotates simultaneously with transmission shaft 13 and all four wheels are driven.

If sub-speed-changing lever 31 is shifted to the high speed position, or steering wheel 4 is steered beyond the predetermined angle, sleeve 20 is slid forward so as to reach the position for the frictional transmission mode. In detail, as shown in FIG. 4, sub-speed-changing lever 31 is shifted to the high speed position H such that sensor 32 is switched on. A signal from sensor 32 is processed by controller 26. An output signal is sent from controller 26 to slide actuator 37. Slide actuator 37 is activated so as to rotate shift arm 22 and forwardly slide sleeve 20, such that power is transmitted to front wheels 12 in the frictional transmission mode. When sensor 25 detects an angle of steering wheel 4 beyond a predetermined angle (for example 25 degrees), the detected signal is inputted into controller 26. Controller 26 activates slide actuator 37 so as to rotate shift arm 22 and slide sleeve 20 forward, such that power is transmitted to front wheels 12 in the frictional transmission mode.

Thus, when sub-speed-changing lever 31 is set to the high speed position for traveling on the road, power is automatically transmitted to front wheels 12 in the frictional transmission mode. In this mode, when friction is generated between front wheels 12 and the road, a slip, or dislocation, is simultaneously generated between frictional plates 19a and 19b in frictional transmission device 19, because the frictional torque between frictional plates 19a and 19b is smaller than that between front wheels 12 and the road. Thus, the peripheral speed of output shaft 18 does not reach a rate at which the peripheral speed of wheels 12 exceeds that of rear wheels 8. Therefore, the peripheral speed of front wheels 12 is restricted up to that of rear wheels 8 so as not to drag front wheels 12. The four-wheel drive vehicle appears to travel as a two-wheel drive vehicle on the road, without the need to switch between the four-wheel drive mode and the two-wheel drive mode. Similarly, front wheels 12 are not dragged during hard cornering so as to provide stability.

The power transmitted to front wheels 12 is controlled through frictional transmission device 19 in the frictional transmission mode. When braking rear wheels 8, the braking force also affects front wheels 12, such that all four wheels are stopped. Thus braking distance can be reduced as compared to braking only the rear wheels in the two-wheel drive mode.

Figure 5:
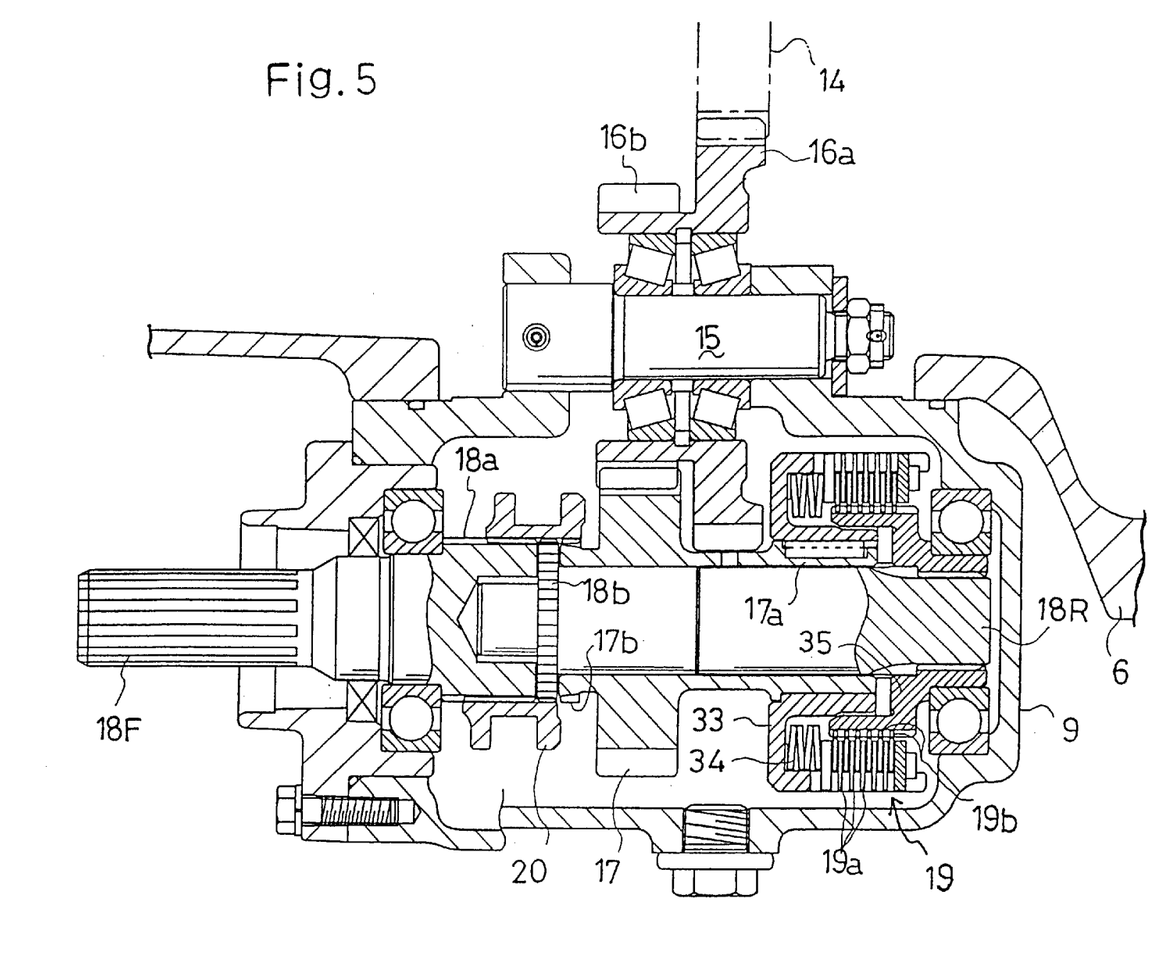
FIG. 5 is a cross-sectional side view of a front wheel drive power take out mechanism according to the second embodiment of the present invention.

Next, explanation will be given of a transmission mechanism for taking out front wheel drive power provided according to a second embodiment of the present invention. Referring to FIG. 5, output shaft 18 is longitudinally divided. The remaining structure is equal to the structure shown in FIGS. 2–4. In detail, a front output shaft 18F and a rear output shaft 18R are disposed co-axially and are supported so as to be rotatable relative to each other. Splines 18a and 18b are formed at the rear portion of the periphery of front output shaft 18F and the front portion of the periphery of rear output shaft 18R, respectively. Sleeve 20 is provided over splines 18a, 18b and clutch teeth 17b so as to not be relatively rotatable and to be axially slidable.

When sleeve 20, as shown under front output shaft 18F in FIG. 5, engages with spline 18a on front output shaft 18F and clutch teeth 17b of transmission gear 17, output shaft 18 is directly connected with transmission gear 17, thereby providing the direct transmission mode. When spline 18a engages with spline 18b without clutch teeth 17b, transmission gear 17 is connected with output shaft 19, thereby providing the frictional transmission mode, so as to create the predetermined frictional torque through frictional transmission device 19.

When sleeve 20 is furthermore forwardly slid so as to also disengage from spline 18b, power is not transmitted to front output shaft 18F, thereby providing the two-wheel drive mode.

In this embodiment, as with the above mentioned embodiment, actuator 37 is switched from the position of the direct transmission mode to the position of the frictional transmission mode when sub-speed-changing lever 31 is shifted to the high-speed position and when steering wheel 4 is steered beyond the predetermined angle. Switching to the two-wheel drive mode is done manually. Alternatively, all the three positions of sleeve 20 may be automatically switched.

Figure 6:
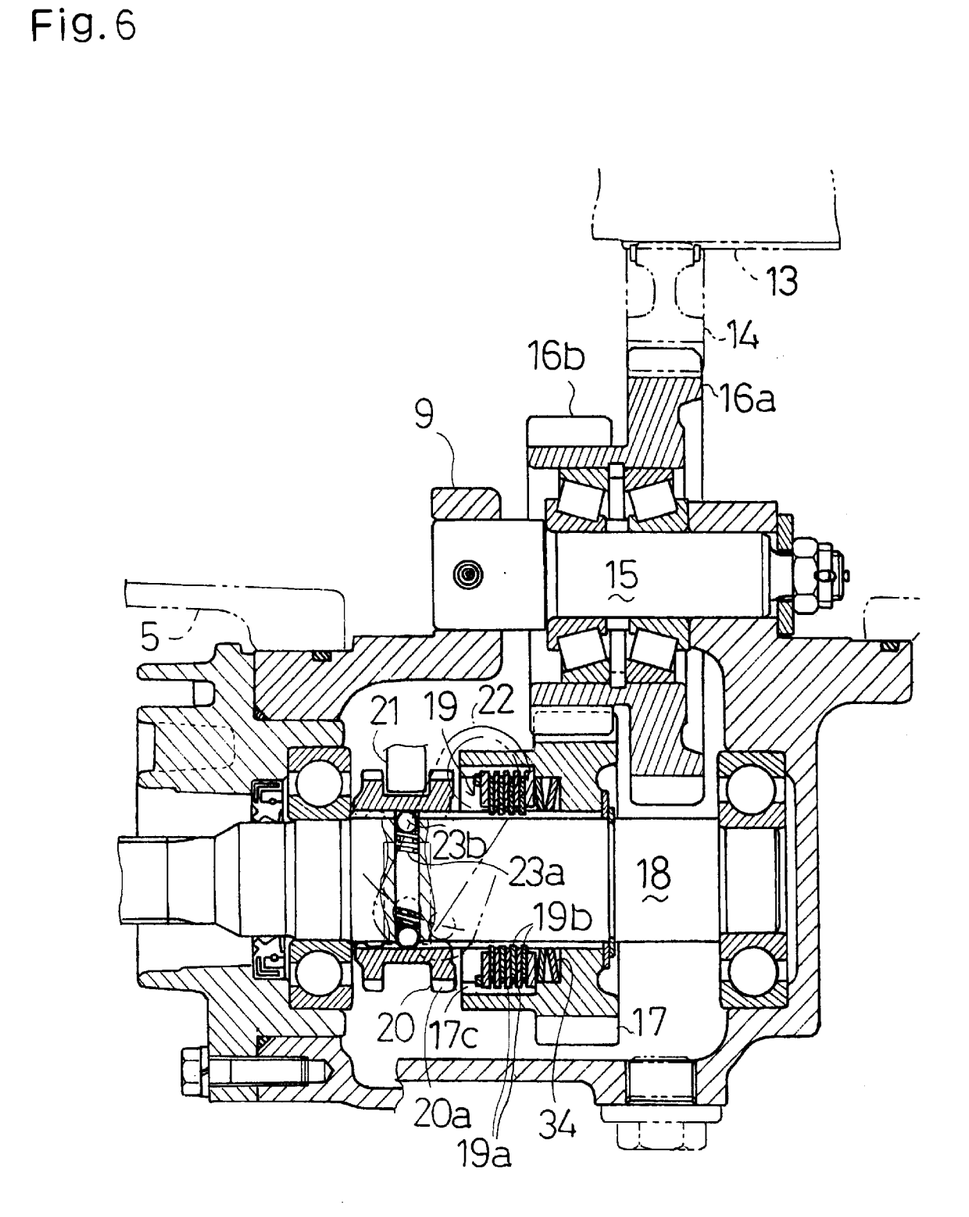
FIG. 6 is a cross-sectional side view of a front wheel drive power take out mechanism according to the third embodiment of the present invention.

Next, explanation will be given of a transmission mechanism for taking out front wheel drive power provided according to a third embodiment of the present invention, as shown in FIG. 6. In the first and second embodiments, described above, transmission gear 17 and clutch casing 33 are independently disposed and frictional transmission device 19 is formed in clutch casing 33. However, in this embodiment, a boss integrally extends forward or rearward (forward in the embodiment shown in FIG. 6) from transmission gear 17 along the axis of output shaft 18 and frictional transmission device 19 is formed in the boss. In detail, a plurality of driving-side frictional plates 19a are engaged with inner teeth 17c longitudinally formed at the inner periphery of the boss so as to not be relatively rotatable and to be axially slidable. A plurality of following-side frictional plates 19b are engaged with splines scored on the outer periphery of output shaft 18 so as to not be relatively rotatable and to be axially slidable.

Each frictional plate 19a and frictional plate 19b are juxtaposed and pressed against each other at a constant maintained pressure. The biasing force of spring 34, as is the case with the first and second embodiment discussed above, is adjusted to limit the frictional torque between frictional plates 19a and 19b so as not to exceed the frictional torque between front wheels 12 and the road.

Sleeve 20, as is the case with the first embodiment shown in FIGS. 2 and 3, is disposed on output shaft 18 so as to be switched back and forth between the two positions relating to the direct transmission mode and the frictional transmission mode. Detent spring 23a and a pair of detent balls 23b are provided in output shaft 18 so as to locate the position of each mode. When sub-speed-changing lever 31 is switched to the high speed position and when steering wheel 4 is steered at an angle beyond the predetermined rate, sleeve 20 is switched to the frictional transmission mode position. When sub-speed-changing lever 31 is not positioned at the high speed position or the cornering angle of steering wheel 4 is less than the predetermined rate, sleeve 20 is switched to the direct transmission mode position.

In this embodiment, frictional transmission device 19 on output shaft 18 is disposed between transmission gear 17 and sleeve 20 so as to downsize the rear portion of front wheel drive power take out casing 9 extending rearward from front wheel drive power take out gear 14 in transmission casing 6. Therefore the front portion thereof extending forward from front wheel drive power take out gear 14 is increased so as to reduce the distance between output shaft 18 and the front wheel differential unit, such that the power transmission ability is increased. On the other hand, the boss having frictional transmission device 19 therein may be extended rearward from transmission gear 17 and formed at the end of output shaft 18.

Figure 7:
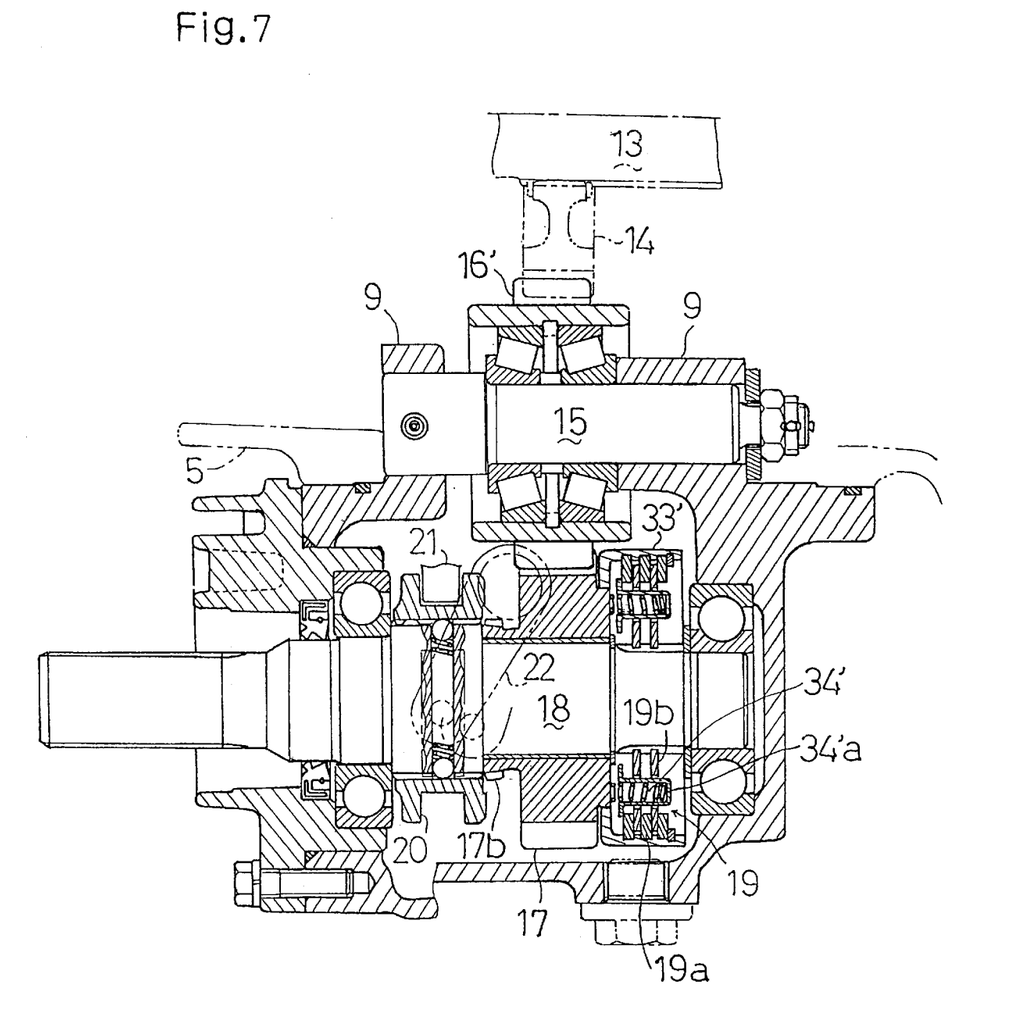
FIG. 7 is a cross-sectional side view of a front wheel drive power take out mechanism according to the fourth embodiment of the present invention.

Next, explanation will be given of a transmission mechanism for taking out front wheel drive power provided according to a fourth embodiment of the present invention. Referring to FIG. 7, frictional transmission device 19 is disposed behind transmission gear 17. A double counter gear 16' is relatively rotatably provided on counter shaft 15 and engaged with transmission gear 17 in front wheel drive power take out casing 9. With regard to double counter gear 16 composed of large diametric gear 16a and small diametric gear 16b, as shown in the first, second and third embodiments, an area for rotating large diametric gear 16 is required in front wheel drive power take out casing 9. However, in this embodiment, a similar area is not required, allowing the length of front wheel drive power take out casing 9 to be reduced. In other words, a boss extending rearward from transmission gear 17 for rotating large diametric gear 16a is not required.

The front end of clutch casing 33', which houses frictional transmission device 19 disposed behind transmission gear 17, is directly fixed onto the rear and of transmission gear 17. Accordingly, the rear portion of front wheel drive power take out casing 9 is reduced even when frictional transmission 19 is disposed behind transmission gear 17. This embodiment can be effective in a structure where there is no need to enlarge the drive ratio from front wheel drive power take out gear 14 to transmission gear 17.

Explanation will be given of the structure of frictional transmission device 19 in this embodiment. A plurality of driving-side frictional plates 19a, are engaged with the inner periphery of clutch casing 33' so as to not be relatively rotatable and to be axially slidable. In clutch casing 33', a plurality of following-side frictional plates 19b are engaged with splines scored on the outer periphery of output shaft 18. Each frictional plate 19a and each frictional plate 19b are juxtaposed. A pipe 34'a, having a closed rear end and an open front end forming a flange, longitudinally passes through the portion of all frictional plates 19b offset by frictional plates 19a. A spring 34' is inserted into pipe 34'a. The front end of spring 34' abuts against the rear end of transmission gear 17 through the open front end of pipe 34'a. The flange of the front end of pipe 34' abuts against the front most frictional plate 19a, so that the front most frictional plate 19a is rearwardly biased so as to press all frictional plates 19a and 19b by the biasing force of spring 34. The frictional torque between frictional plates 19a and 19b generated by the biasing force is limited so as to be smaller than that between front wheels 12 and the road, thereby providing the frictional transmission mode, similar to that discussed above.

The structures of sleeve 20, detent spring 23a and detent balls 23b are similar to those discussed above. Sleeve 20 can be switched back and forth between the respective positions corresponding to the direct transmission mode and the frictional transmission mode. Also, in accordance with shifting sub-speed-changing lever 31 to the high speed position and steering operation of steering wheel 4 beyond the predetermined angle, sleeve 20 can be automatically switched to the frictional transmission mode.

Next, explanation will be given of a transmission mechanism for taking out front wheel drive power provided according to a fifth embodiment of the present invention. Referring to FIG. 8, frictional transmission device 19 of the present embodiment is a hydraulic multidisc clutch which can adjust the biasing force between the frictional plates so as to provide the respective states of the frictional transmission mode and the direct transmission mode.

In detail, a plurality of driving-side frictional plates 19a are engaged with the outer periphery of the boss of transmission gear 17 rotatably provided on output shaft 18 so as to not be relatively rotatable and to be axially slidable. A plurality of following-side frictional plates 19b is engaged with the inner periphery of clutch cylinder 40 fixed on output shaft 18 and covering the boss of transmission gear 17. A spring chamber 40a is formed in clutch cylinder 40 so as to insert spring 41 therein. A piston 42 is disposed between the boss of clutch cylinder 40 fixed on output shaft 18 and the cylinder formed by the outer periphery thereof so as to be slidable co-axially with output shaft 18. Piston 42 is biased so as to press frictional plates 19a and 19b by spring 41. The biasing force of spring 41 is set so as to limit the frictional torque between the frictional plates 19a and 19b so as to be smaller than that between front wheels 12 and the road for providing the frictional transmission mode.

Pressurized oil for acting piston 42 can be supplied from a hydraulic pump 43 into spring chamber 40a through a mode switching valve 44. A relief valve 45 is disposed in a passage of the pressurized oil so as to set the acting pressure of piston 42. When the pressurized oil is provided, piston 42, which is pressured by the pressurized oil in addition to the biasing of spring 41, presses frictional plates 19a and 19b in approximate contact with one another, thereby providing the direct transmission mode.

A two-positioned electromagnetic solenoid valve is used for mode switching valve 44. When an operator sets a mode selecting tool (like a lever), which is provided for selecting one of the two four-wheel drive mode types, to the frictional transmission mode, mode switching valve 44 is switched to the left position shown in FIG. 5 such that the oil in spring chamber 40a is drained so as to make piston 42 press frictional plates 19a and 19b by only the biasing force of spring 41. On the other hand, when the mode selecting tool is set to the direct transmission mode, mode switching valve 44 is switched to the right position so that spring chamber 40a is supplied with pressurized oil from oil pump 43, so that both the biasing force of spring 41 and the pressurized oil make piston 42 press frictional plates 19a and 19b.

In another embodiment, sensor 82 can be used to detect the operation of sub-speed-changing lever 31 to the high speed position and sensor 25 to detect the steering angle of steering wheel 4 beyond the predetermined rate, instead of the mode selecting tool, as discussed above, so as to input the detecting signals thereof into controller 20 and output the output signals from controller 26 to mode switching valve 44 instead of actuator 87.

In another embodiment, spring 41 and mode switching valve 44 can be omitted and relief valve 45 can be made adjustable. In detail, a spring retainer for a relief spring of relief valve 45 is made to be movable according to the operation of the mode selecting tool or the sensor detecting signals corresponding to the sub-speed-changing lever 31 and steering wheel 4. When the front wheel transmission mode is set to the frictional transmission mode by such operation or detection, the spring retainer moves so as to weaken the biasing force of the relief spring, thereby reducing the oil pressure for acting piston 41 so as to reduce the frictional torque between frictional plates 19a and 19b to the degree corresponding to the frictional transmission mode. When set to the direct transmission mode, the spring retainer moves so as to enlarge the biasing force of the relief spring, thereby increasing the oil pressure for acting piston 41 so as to increase the frictional torque between frictional plates 19a and 19b to the degree corresponding to the direct transmission mode.

In the above first through fifth embodiments, frictional transmission device 19 is a frictional multidisc clutch, however, a viscous clutch or a cone clutch is also acceptable. Also, the clutch mechanism shown in the first through fourth embodiments is a dog clutch for engaging sleeve 20 with clutch teeth 17b of transmission gear 17, however, a claw clutch or a ball clutch is also accepted.

What is claimed is:

1. A four-wheel drive vehicle comprising;
    a left and a right first driving wheel having a braking unit;
    a first transmission system for transmitting power from a prime mover to said first driving wheels;
    a left and a right second driving wheel;
    a second transmission system branching off from said first transmission system for transmitting power from said first transmission system to said second driving wheels;
    a frictional transmission passage provided in said second transmission system, wherein the frictional torque of said frictional transmission passage is set smaller than the friction between said second driving wheels and a road surface; and
    a direct transmission provided in said second transmission passage, wherein said direct transmission passage bypasses said frictional transmission passage;
    wherein one of said frictional transmission passage and said direct transmission passage is selected.

2. A four-wheel drive vehicle according to claim 1 further comprising:
    a means for changing the speed of said first driving wheels provided in said first transmission system having a high speed stage and a low speed stage, wherein said frictional transmission passage is selected while said speed changing means is set in said high speed stage, and said direct transmission passage is selected while said means is set in said low speed stage.

3. A four-wheel drive vehicle according to claim 2, wherein power transmission from said first transmission system to said second transmission system can be shut-off.

4. A four-wheel drive vehicle according to claim 1, wherein said second driving wheels are steerable wheels.

5. A four-wheel drive vehicle according to claim 4, wherein said frictional transmission passage is selected while the cornering angle of said second driving wheels is not less than a predetermined angle, and said direct transmission passage is selected while the cornering angle of said second driving wheels is less than said predetermined angle.

6. A four-wheel drive vehicle according to claim 5, wherein power transmission from said first transmission system to said second transmission system can be shut-off.

7. A four-wheel drive vehicle comprising;
    a left and a right first driving wheel having a braking unit;
    a first transmission system transmitting power from a prime mover to said first driving wheels;
    a left and a right second driving wheel;
    a second transmission system branching off from said first transmission system for transmitting power from said first transmission system to said second driving wheels;
    a frictional transmission passage provided in said second transmission system, wherein a slip is generated in said frictional transmission passage while said second driving wheels are subject to a frictional resistance from a road surface; and a direct transmission passage provided in said second transmission system bypassing said frictional transmission passage;

wherein one of said frictional transmission passage and said direct transmission passage is selected.

8. A four-wheel drive vehicle according to claim 7, further comprising:

a means for changing the speed of said first driving wheels provided in said first transmission system having a high speed stage and a low speed stage, wherein said frictional transmission passage is selected while said speed changing means is set in said high speed stage and said direct transmission passage is selected while said speed changing means is set in said low speed stage.

9. A four-wheel drive vehicle according to claim 8, wherein power transmission from said first transmission system to said second transmission system can be shut-off.

10. A four-wheel drive vehicle according to claim 7, wherein said second driving wheels are steerable wheels.

11. A four-wheel drive vehicle according to claim 10, wherein said frictional transmission passage is selected while the cornering angle of said second driving wheels is not less than a predetermined angle, and said direct transmission passage is selected while the cornering angle of said second driving wheels is less than said predetermined angle.

12. A four-wheel drive vehicle according to claim 11, wherein power transmission from said first transmission system to said second transmission system can be shut-off.

13. A four-wheel drive vehicle comprising:

a left and a right first driving wheel having a braking unit;

a first transmission system transmitting power from a prime mover to said first driving wheels;

a left and a right second driving wheel;

a second transmission system branching off from said first transmission system for transmitting power from said first transmission system to said second driving wheels;

a frictional transmission passage provided in said second transmission system, wherein the frictional torque generated in said frictional transmission passage is set so as to enable said braking unit to transmit the braking torque thereof applied on said first driving wheels to said second driving wheels; and a direct transmission passage provided in said second transmission system bypassing said frictional transmission passage;

wherein one of said frictional transmission passage and said direct transmission passage is selected.

14. A four-wheel drive vehicle according to claim 13, further comprising:

a means for changing the speed of said first driving wheels provided in said first transmission system having a high speed stage and a low speed stage, wherein said frictional transmission passage is selected while said speed changing means is set in said high speed stage, and said direct transmission passage is selected while said speed changing means is set in said low speed stage.

15. A four-wheel drive vehicle according to claim 14, wherein power transmission from said first transmission system to said second transmission system can be shut-off.

16. A four-wheel drive vehicle according to claim 13, wherein said second driving wheels are steerable wheels.

17. A four-wheel drive vehicle according to claim 16, wherein said frictional transmission passage is selected while the cornering angle of said second driving wheels is not less than a predetermined angle, and said direct transmission passage is selected while the cornering angle of said second driving wheels is less than said predetermined angle.

18. A four-wheel drive vehicle according to claim 17, wherein power transmission from said first transmission system to said second transmission system can be shut-off.

19. A four-wheel drive vehicle comprising:

a left and a right first driving wheel having a braking unit;

a first transmission system transmitting power from a prime mover to said first driving wheels;

a left and a right second driving wheel;

a transmission gear rotated by power transmitted from said first transmission system;

an output shaft for transmitting power to said second driving wheels wherein said transmission gear is relatively rotatably provided on said output shaft;

a frictional transmission device interposed between said transmission gear and said output shaft, wherein said frictional transmission device generates a slip between said transmission gear and said output shaft while said second driving wheels are subject to a frictional resistance from a road surface, and a direct transmission device disposed in parallel with said frictional transmission device;

wherein one of said frictional transmission device and said direct transmission device is selected.

20. A four-wheel drive vehicle according to claim 19, further comprising:

a means for changing the speed of said first driving wheels provided in said first transmission system and having a high speed stage and a low speed stage, wherein said frictional transmission passage is selected while said speed changing means is set in said high speed stage, and said direct transmission passage is selected while said speed changing means is set in said low speed stage.

21. A four-wheel drive vehicle according to claim 20, wherein power transmission from said first transmission system to said second transmission system can be shut-off.

22. A four-wheel drive vehicle according to claim 19, wherein said second driving wheels are steerable wheels.

23. A four-wheel drive vehicle according to claim 22, wherein said frictional transmission passage is selected while the cornering angle of said second driving wheels is not less than a predetermined angle, and said direct transmission passage is selected while the cornering angle of said second driving wheels in less than said predetermined angle.

24. A four-wheel drive vehicle according to claim 23, wherein power transmission from said first transmission system to said second transmission system can be shut-off.

25. A four-wheel drive vehicle comprising:

a left and a right first driving wheel having a braking unit;

a first transmission system for transmitting power from a prime mover to said first driving wheels;

a pair of left and right second driving wheels;

a second transmission system branching off from said first transmission system for transmitting power from said first transmission system to said second driving wheels;

a frictional transmission passage provided in said second transmission system, wherein the frictional torque generated in said frictional transmission passage can be switched between a small state such as to generate a slip and a large state such as to prevent a slip.

26. A four-wheel drive vehicle according to claim 25, further comprising:

a means for changing the speed of said first driving wheels provided in said first transmission system having a high speed stage and a low speed stage, wherein said frictional torque of said frictional passage is set to said small state while said speed changing means is set in said high speed stage, and is set to said large state while said speed changing means is set in said low speed stage.

27. A four-wheel drive vehicle according to claim 26, wherein power transmission from said first transmission system to said second transmission system can be shut-off.

28. A four-wheel drive vehicle according to claim 25, wherein said second driving wheels are steerable wheels.

29. A four-wheel drive vehicle according to claim 28, wherein said frictional torque of said frictional passage is set to said small state while the cornering angle of said second driving wheels is not less than a predetermined angle, and is set in said large state while the cornering angle of said second driving wheels is less than the said predetermined angle.

30. A four-wheel drive vehicle according to claim 29, wherein power transmission from said first transmission system to said second transmission system can be shut-off.

* * * * *